United States Patent [19]
Burkhard

[11] Patent Number: 5,459,289
[45] Date of Patent: Oct. 17, 1995

[54] PRECISION BALANCE WITH AN INTERMEDIATE MEMBER CONNECTING A MEASURING CELL TO A HOUSING

[75] Inventor: Hans-Rudolf Burkhard, Schwerzenbach, Switzerland

[73] Assignee: Mettler-Toledo AG, Greifensee, Switzerland

[21] Appl. No.: 27,883

[22] Filed: Mar. 8, 1993

[30] Foreign Application Priority Data

Jun. 9, 1992 [CH] Switzerland .............. 1826/92

[51] Int. Cl.$^6$ ................................................ G01G 21/28
[52] U.S. Cl. ........................................ 177/244; 73/862.637
[58] Field of Search ................ 73/862.637, 862.638, 73/862.639, 862.642; 177/128, 211, 244

[56] References Cited

U.S. PATENT DOCUMENTS

| | | | |
|---|---|---|---|
| 3,935,915 | 2/1976 | Seilly et al. | 177/211 X |
| 4,215,754 | 8/1980 | Hagedorn et al. | 177/211 X |
| 5,205,369 | 4/1993 | Neeleman | 177/229 |

FOREIGN PATENT DOCUMENTS

| | | |
|---|---|---|
| 0227850 | 7/1987 | European Pat. Off. . |
| 0345169B1 | 12/1989 | European Pat. Off. . |
| 3619182C2 | 3/1988 | Germany . |
| 9203796 | 5/1992 | Germany . |

OTHER PUBLICATIONS

Patent Abstracts of Japan, vol. 5, No. 202 (P-95) (874) 22, Dec. 1981 & JP-A-56 125 628 (Kubota Dekko K.K.) 2, Oct. 1981.

*Primary Examiner*—Peter S. Wong
*Assistant Examiner*—Randy W. Gibson
*Attorney, Agent, or Firm*—Friedrich Kueffner

[57] ABSTRACT

A precision balance includes a load receiving member, a balance housing and a measuring cell connected to the load receiving member and the balance housing. The measuring cell is arranged between side portions of an intermediate support member and is fastened thereto in a frictionally engaging manner. The contact surfaces between the intermediate support member and the measuring cell can be produced with narrow tolerances in a simple manner, so that a screw connection between the intermediate support member and the measuring cell does not introduce significant distorting forces into the measuring cell. The measuring cell can be adjusted with the intermediate support member before being mounted in the balance housing. The later mounting of the measuring cell does not influence the adjustment because the intermediate arrangement of the intermediate support member disconnects the measuring cell from inaccuracies of the fastening surfaces on the housing.

9 Claims, 2 Drawing Sheets

PRECISION BALANCE WITH AN INTERMEDIATE MEMBER CONNECTING A MEASURING CELL TO A HOUSING

BACKGROUND OF THE INVENTION

1. Field of the Invention

The present invention relates to a precision balance with a load receiving means, a balance housing, and a measuring cell connected to the load receiving means and the balance housing.

2. Description of the Related Art

In precision balances of the above-described type, a force acting on the weighing dish is transmitted through a load receiving means into a force measuring cell which is placed in the balance housing and is connected to the latter, usually by a screw connection. Because of the screw connection of the measuring cell with the housing, forces are introduced into the measuring cell which may influence the weighing result. In order to compensate the influence of the stresses which act on the measuring cell because of the screw connection and which, depending on the construction and the stability of the balance housing, may be different, it is necessary to adjust each measuring cell after it has been placed in the balance housing. This adjustment can be carried out relatively easily during the manufacturing process, i.e. by the manufacturer. However, away from the manufacturer the adjustment poses problems, particularly if the measuring cell of a balance must be removed and repaired or replaced at a later time when the balance has been improperly treated or the balance has been in use for a long time or because of material defects. It is extremely difficult to carry out the adjustment at the customer, either by personnel of the manufacturer or by personnel of the customer. An improper adjustment always leads to a falsification of the weighing result. In addition, the known type of mounting the measuring cell requires that the measuring cell be adapted to each type of balance. This, in turn, requires the manufacture of small quantities of each type of balance and, thus, leads to higher manufacturing costs.

SUMMARY OF THE INVENTION

Therefore, it is the primary object of the present invention to provide a precision balance in which the adjustment of the weighing system can be carried out efficiently.

In accordance with the present invention, a precision balance of the above-described type includes a U-shaped intermediate support member, wherein the measuring cell is arranged and mounted between side members of the U-shaped intermediate support member and is fastened thereto in a frictionally engaging or locking manner.

The arrangement of the measuring cell within a U-shaped intermediate support member makes it possible to adjust the measuring cell outside of the balance housing and to mount the adjusted unit in the balance housing. A unit adjusted in this manner not only simplifies the adjustment by the manufacturer and the subsequent assembly of the new balance, but it is also possible to ship adjusted units as replacement parts and to mount them in older balances. The high stiffness of the intermediate support member with respect to torsion, relative to the load-bearing portion of the measuring cell, ensures that the adjustment of the measuring cell is not impaired after the fastening of the intermediate support member in the housing of the balance. In addition, the requirements with respect to the accuracy of the fastening surfaces for the intermediate support member in the balance housing may be less stringent. The manufacture of exact support surfaces of the measuring cell on the intermediate support member is substantially simpler than the machining of support surfaces within the balance housing. The high precision of the support of the measuring cell on the intermediate support member reduces the introduction of forces which would influence the measuring result through the connecting elements between the intermediate support member and the measuring cell. The measuring cell can be fastened on the intermediate support member in such a way that forces acting on the intermediate support member during fastening thereof on the balance housing do not exert harmful influences on the measuring cell. Specifically, any residual influences from the screw connection will remain constant as long as the adjusted unit consisting of intermediate support member and measuring cell remains unseparated.

When the measuring cell is fastened by means of a clamping means, the forces which would be introduced by screws into the interior of the measuring cell can be completely eliminated. The clamping forces produced by the fastening screws are absorbed by an appropriately dimensioned clamping plate and by the intermediate support member and are kept away from those parts of the measuring cell which are sensitive to stresses. The structure of the balance housing or the arrangement of the measuring cell within the balance housing have no influence on the adjustment which has already been carried out.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DESCRIPTION OF THE PREFERRED EMBODIMENT

Figure 1:
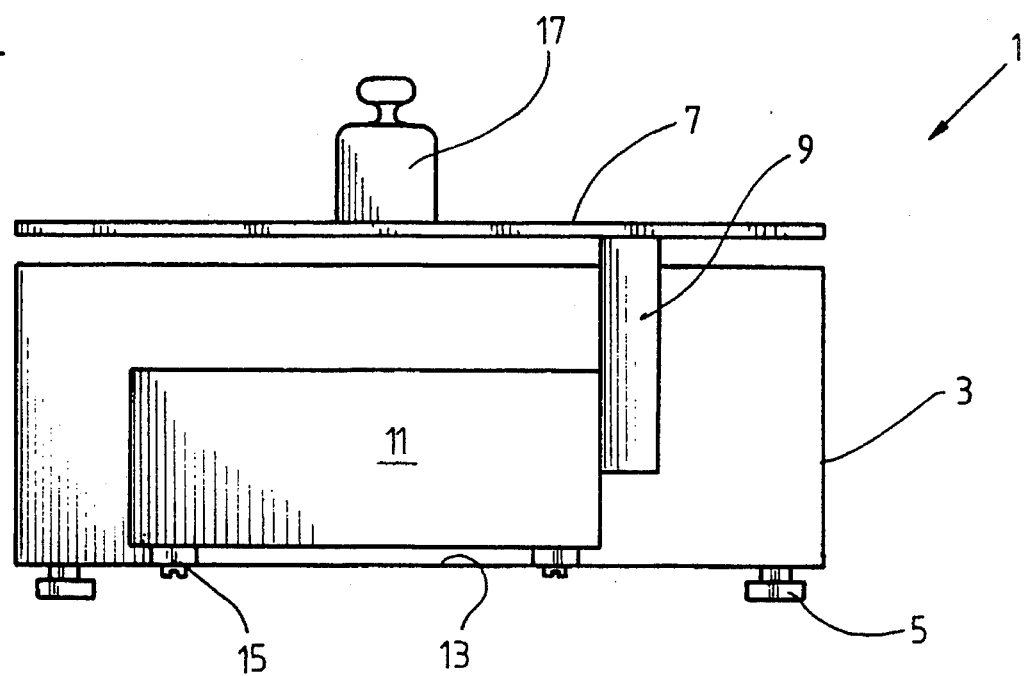
FIG. 1 is a schematic elevational view of a precision balance.

FIG. 1 of the drawing schematically illustrates a conventional top-loading precision balance 1. Reference numeral 3 denotes a balance housing which rests on legs 5 and includes a weighing dish 7. The weighing dish 7 is connected through a load receiving means 9 to a force measuring cell 11 illustrated schematically as a rectangle. The measuring cell 11 rests either directly or with appropriate support surfaces 15 on the bottom 13 of the balance housing 3 and is connected thereto in a frictionally engaging manner at contact points with the bottom 13. To illustrate a load, a weight 17 is placed on the weighing dish 7. The bottom 13 of the balance housing 3 is finished at least in the areas of the contact points 15 in a narrow tolerance range in order to form a defined support surface for the measuring cell 11.

Figure 2:
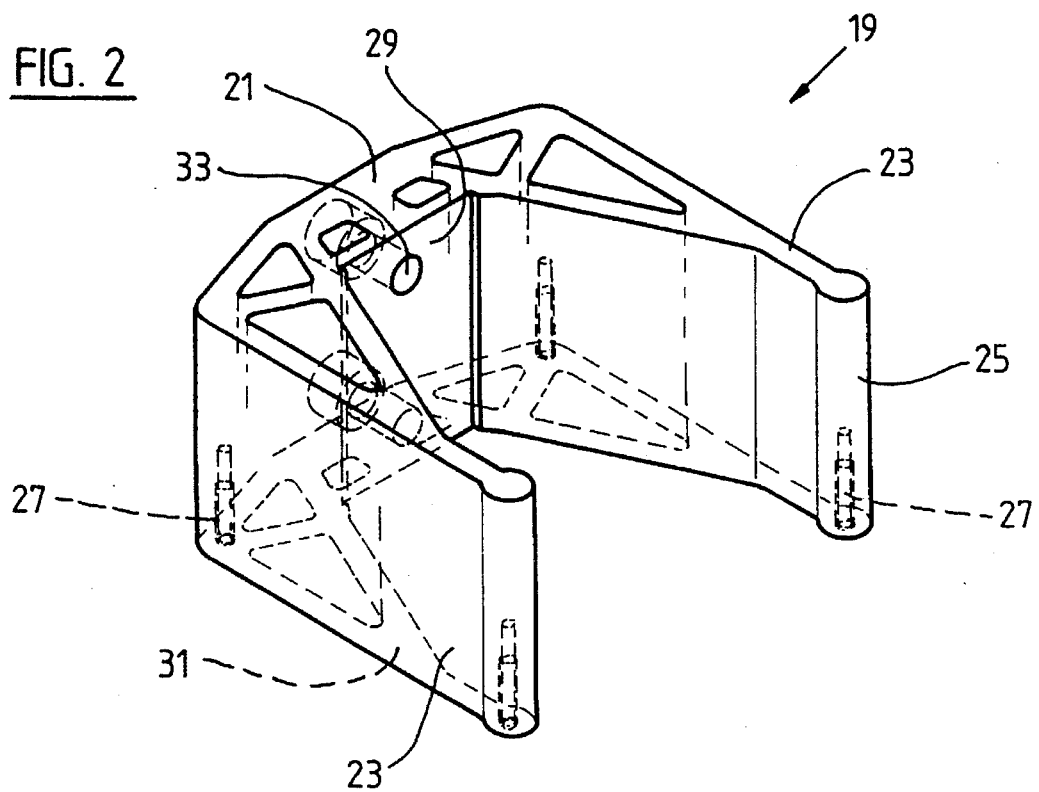
FIG. 2 is a perspective view, on a larger scale, of an intermediate support member for a screw connection.

FIG. 2 of the drawing shows in a perspective view a U-shaped intermediate support member 19 in accordance with the present invention which is intended to receive the measuring cell 11. The intermediate support member 19 may be manufactured from a drawn aluminum section, may be processed from a solid piece or may be cast. The intermediate support member 19 includes a base portion 21 and two side portions 23 which extend from the base portion 21 and complete the U-shape. The cross-section of the intermediate support member 21 is constructed in such a way that an optimum stiffness with respect to torsion can be obtained in relation to the load capacity of the balance 1.

Threaded bores 27 are provided in the ends 25 of the side portions 23. At least one additional centrally located threaded bore 27 can be provided at the bottom surface of the base portion 21. In the illustrated embodiment, instead of one additional threaded bore 27, a threaded bore 27 each is provided in the transition areas between the side portions 23 and the base portion 21. The bores 27 serve for fastening the intermediate support member 19 to the housing bottom 13.

Figure 3:
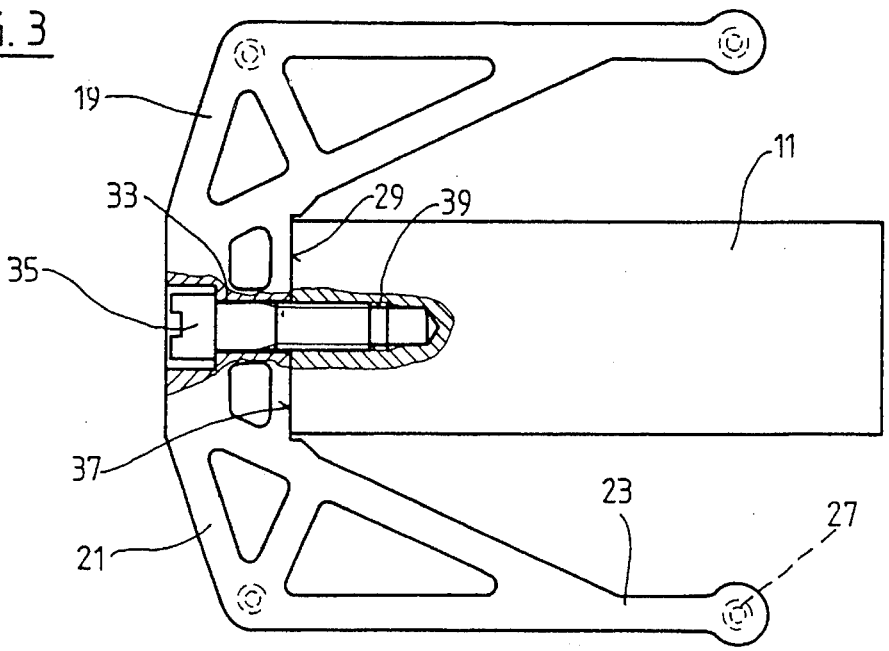
FIG. 3 is a plan view of the intermediate support member of FIG. 2.

The surface 29 of the base portion 21 located between the side portions 23 is finished exactly plane and extends exactly at a right angle relative to the end face 31 which is located at the bottom in the illustration of FIG. 2. The end face 31 is preferably also finished plane within narrow tolerances as long as no contact or support surfaces 15 are provided on the housing bottom 13. This can be done without problems in a work piece of this type. Two bores 33 in the base portion 21 are intended to receive a screw 35 each for fastening the measuring cell 11 to the intermediate support member 19. As shown in FIG. 3, appropriately aligned threaded bores 39 are provided for this purpose in the side surface 39 of the measuring cell 11. The side surface 39 is also finished plane within narrow tolerances, so that a torsion-free placement of the measuring cell 11 on the surface 29 on the intermediate support member 19 takes place.

After the measuring cell 11 has been fastened to the intermediate support member 19, the measuring cell can be adjusted outside of the balance housing 3. The adjustment of the measuring cell 11 is very simple because there are no additional elements of the balance which would impair access to the measuring cell 11. The adjusted measuring cell 11 can subsequently be mounted in a balance housing 3, for example, by a screw connection of the intermediate support member 19 through the bottom 13 of the balance housing 3. The support surface on the bottom 13 of the balance housing 3 does not have to be finished with high precision because distortion of the rigid intermediate support member 19 by the less rigid bottom 13 does not have to be expected.

Figure 4:
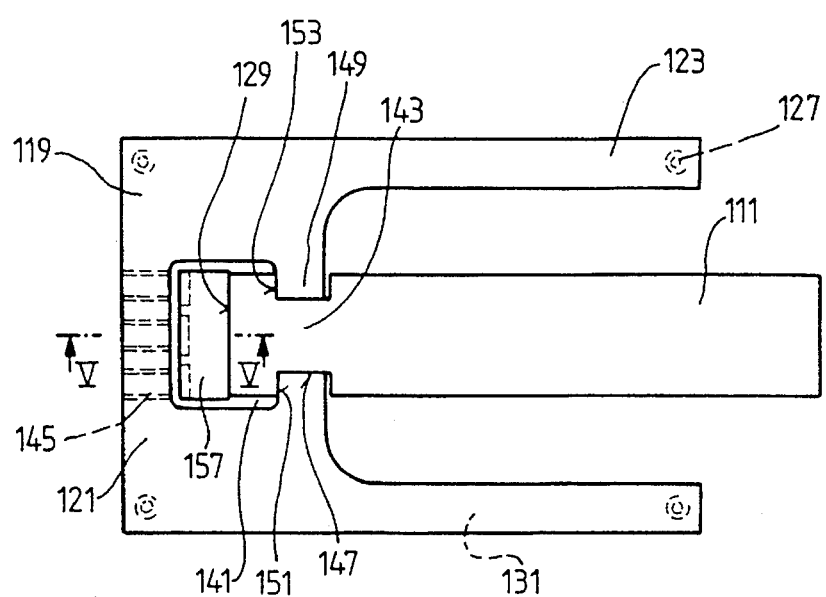
FIG. 4 is a top view of another embodiment of an intermediate support member with clamped fastening.
Figure 5:
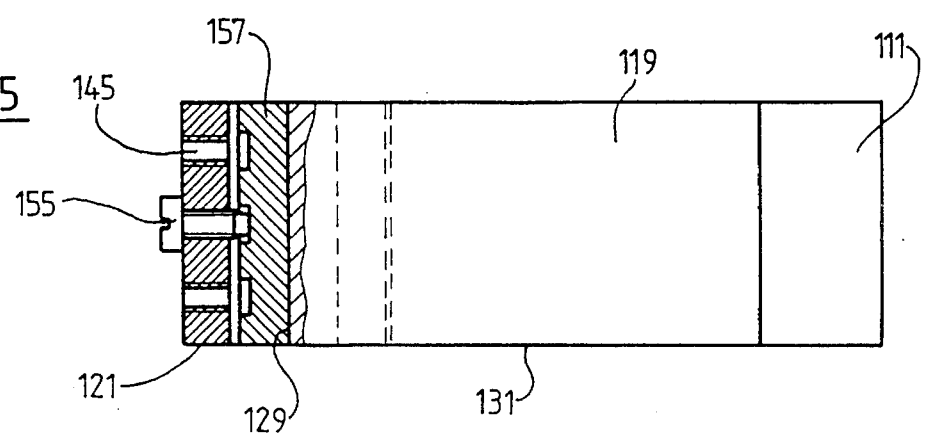
FIG. 5 is a partial sectional view taken along sectional line V—V in FIG. 4.

In the embodiment of the present invention according to FIGS. 4 and 5 of the drawing, the intermediate support member 119 is also U-shaped and has two side portions 123 which extend parallel to the measuring cell 111. The measuring cell 111 is supported at the base thereof in a recess 141. The recess 141 which extends perpendicularly to the lower end face 131 of the intermediate support member 121 has at the side portions a slot 143. The base portion 121 has a plurality of threaded bores 145, for example, nine threaded bores arranged in three rows of three bores.

The measuring cell 111 has on each side a groove 147 for receiving the lateral portions 149 of the slot 143. The lateral contact surfaces 151 of the grooves 147 as well as the sides 153 of the lateral portions 149 are processed with narrow tolerances in order to facilitate a problem-free surface contact. Instead of a large-surface contact, it is also possible to provide several small contact surfaces, for example, one each at the top and the bottom.

Clamping screws 155 are screwed into the threaded bores 145. The front ends of the clamping screws 155 rest against a clamping plate 157 which, in turn, rests against the surface 129 of the measuring cell 111. The clamping screws 155 may also rest directly against the surface 129.

Fastening of the measuring cell 111 in the intermediate support member 119 may be effected in a simple manner by inserting the measuring cell 111 guided by the grooves 147 into the slot 143 and by pressing the measuring cell 111 by means of the screws 155 against the side surfaces 153. As a result, the measuring cell 111 remains essentially without tension because no forces are introduced from the threaded bores into the interior.

The intermediate support member according to the present invention can be used in connection with measuring cells of different types. For example, cells with electromagnetic load compensation or string-type measuring cells may be used.

It should be understood that the preferred embodiments and examples described are for illustrative purposes only and are not to be construed as limiting the scope of the present invention which is properly delineated only in the appended claims.

What is claimed is:

1. A precision balance comprising a load receiving means, a measuring cell connected to the load receiving means, and a balance housing, further comprising a U-shaped intermediate support member having a base portion and side portions connected to the base portion, the measuring cell being mounted between the side portions, means for fastening the measuring cell to the intermediate support member in a frictionally engaging manner, and means for fastening the intermediate support member to a base portion of the balance housing.

2. The balance according to claim 1, wherein the balance has a loading range, the intermediate support member having a stiffness with respect to torsion within limits of the loading range of the balance.

3. The balance according to claim 1, comprising means for connecting in a frictionally engaging manner the intermediate support member to the balance housing.

4. The balance according to claim 1, wherein the intermediate support member has a central distortion-neutral portion, and wherein the connection of the measuring cell to the intermediate support member is at the base portion of the intermediate support member and at the central distortion-neutral portion thereof.

5. The balance according to claim 1, comprising a screw connection between the measuring cell and the intermediate support member.

6. The balance according to claim 1, comprising clamping means for clamping the measuring cell against the intermediate support member.

7. The balance according to claim 6, wherein the base portion of the intermediate support member has threaded bores, the clamping means being screws extending through the threaded bores for clamping the measuring cell against the intermediate support member.

8. The balance according to claim 7, further comprising a clamping plate between the screws and the measuring cell.

9. A precision balance comprising a load receiving means, a measuring cell connected to the load receiving means, and a balance housing, further comprising a U-shaped intermediate support member having a base portion and side portions connected to the base portion, the base portion and the side portions forming walls extending in a vertical direction, the measuring cell being mounted between the side portions, means for fastening the measuring cell to the intermediate support member in a frictionally engaging manner, and means for fastening the intermediate support member to the base portion of the balance housing.

* * * * *